(12) United States Patent
Huang

(10) Patent No.: US 7,599,253 B1
(45) Date of Patent: Oct. 6, 2009

(54) HYBRID PRESSURE AND VECTOR SENSOR TOWED ARRAY

(75) Inventor: Dehua Huang, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/221,149

(22) Filed: Jul. 24, 2008

(51) Int. Cl.
*G01S 3/801* (2006.01)
(52) U.S. Cl. .................. 367/130; 367/119; 367/129
(58) Field of Classification Search .......... 367/106, 367/129, 130, 119
See application file for complete search history.

(56) References Cited

U.S. PATENT DOCUMENTS

| 5,930,201 | A * | 7/1999 | Cray | 367/119 |
| 6,697,302 | B1 * | 2/2004 | Cray et al. | 367/141 |
| 7,274,622 | B1 * | 9/2007 | Huang et al. | 367/105 |
| 2008/0198695 | A1 * | 8/2008 | Abdi | 367/134 |

* cited by examiner

*Primary Examiner*—Ian J Lobo
(74) *Attorney, Agent, or Firm*—James M. Kasischke; Jean-Paul A. Nasser; Michael P. Stanley

(57) ABSTRACT

The invention as disclosed is of a combined acoustic pressure and acoustic vector sensor array, where multiple acoustic pressure sensors are integrated with an acoustic vector sensor in a towed array as a means of resolving the left-right ambiguity of the multiple acoustic pressure sensors.

1 Claim, 3 Drawing Sheets form a vector sensor towed array, where all hydrophone elements of the towed array are replaced by vector sensors or combined pressure-vector sensors. However, this approach introduces a higher level of complexity in regard to the design and operation of the towed array. In order to have a successful working array made of all combined vector sensors, the three dimensional orientations for each vector sensor in the array must be known. Instead of forming an n-element vector sensor towed array, what is needed is a means to resolve the left-right ambiguity in towed arrays of hydrophone sensors through the use of a single combined pressure-vector sensor package, where a pressure hydrophone sensor is integrated with an acoustic vector sensor.

HYBRID PRESSURE AND VECTOR SENSOR TOWED ARRAY

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to underwater acoustic sensors. In particular, the present invention is directed to hydrophones in towed arrays for use with underwater vehicles.

(2) Description of the Prior Art

Underwater vehicles currently utilize n-element towed arrays of acoustic pressure hydrophone sensors. Each hydrophone in the towed array has an omni-directional acoustic beam response. When a hydrophone towed array is designed, the linear array demonstrates an axial symmetric beam pattern. Because of this axial symmetric response, a target signal coming from either the left or the right has the same array response. The inability to distinguish between a left or right array response is referred to as the "left-right ambiguity". An n-element towed array beam pattern is shown in FIG. 1a, where the towed direction is along the x-axis, and the y-axis is at the starboard direction and z-axis is upward.

An acoustic vector sensor, either particle velocity sensor or accelerometer sensor detects the acoustic information from sound wave particle velocity or acceleration. A single acoustic vector sensor demonstrates a cosine beam pattern independent of the sound wave frequency. To resolve the left-right ambiguity, one could form a vector sensor towed array, where all hydrophone elements of the towed array are replaced by vector sensors or combined pressure-vector sensors. However, this approach introduces a higher level of complexity in regard to the design and operation of the towed array. In order to have a successful working array made of all combined vector sensors, the three dimensional orientations for each vector sensor in the array must be known. Instead of forming an n-element vector sensor towed array, what is needed is a means to resolve the left-right ambiguity in towed arrays of hydrophone sensors through the use of a single combined pressure-vector sensor package, where a pressure hydrophone sensor is integrated with an acoustic vector sensor.

SUMMARY OF THE INVENTION

It is a general purpose and object of the present invention to resolve the left-right ambiguity in towed arrays of hydrophone sensors by hybrid technique.

The above object is accomplished with the present invention through the use of a combined pressure-vector sensor package, where a pressure hydrophone sensor is integrated with an acoustic vector sensor of tri-axes.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION OF THE INVENTION

Figure 3A:
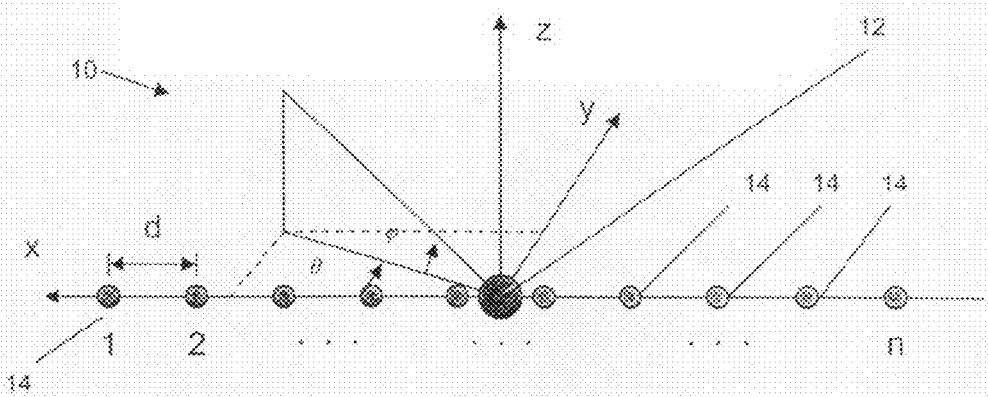
FIG. 3a is an example of a hybrid towed array with a combined vector sensor is located at the acoustic center of the array, while the other n-elements are conventional hydrophone elements.

The towed array design of the present invention is a hybrid towed array, where only one element is a combined vector sensor and the rest are all hydrophone sensors. FIG. 3a illustrates an example of a hybrid linear towed array 10 of (n) sensor elements, where one of the sensor elements is a combined vector sensor 12 located at the acoustic center of the array, while the other n-elements are pressure sensors (i.e. hydrophones) 14 distributed throughout the array.

Figure 1A:
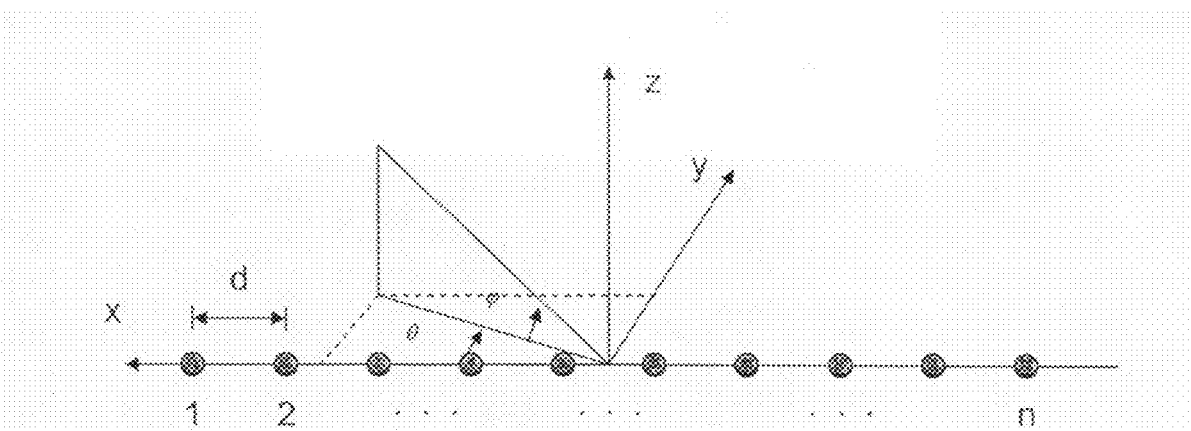
FIG. 1a shows an n-element hydrophone towed array configuration, where d is the element spacing, x is the forward direction, y is starboard direction, and $\theta$ and $\phi$ are bearing and D/E angles respectively.
Figure 1B:
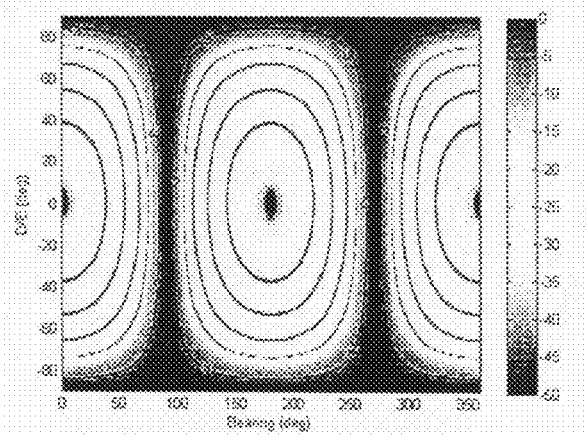
FIG. 1b is an example of a two-dimensional $\theta$ and $\phi$ beam pattern contour plot for a 10 element hydrophone towed array of −25 dB Taylor shading.
Figure 1C:
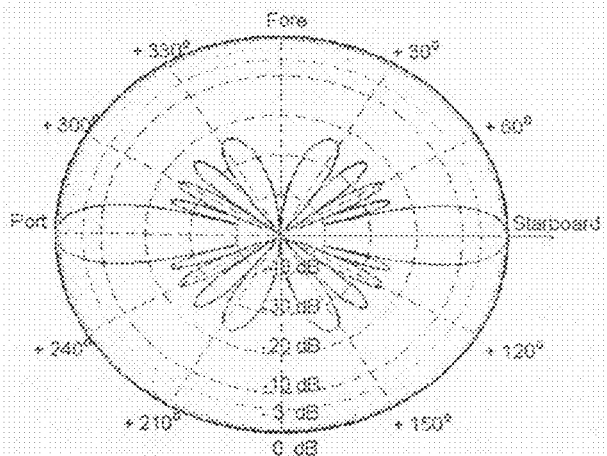
FIG. 1c is a single slice at $\phi$ equals zero degree beam pattern in polar plot for the 10 element hydrophone towed array.

Within the hybrid towed array 10, the n-element pressure sensor array shows a beam pattern, $D_1(\theta,\phi)$, similar to the beam pattern illustrated in FIG. 1b, based on the following equation, where i is $\sqrt{-1}$, $\theta$ is the bearing and $\phi$ is elevation and depression angles respectively, and $p_{max}(\theta,\phi)$ is a normalization constant, which equals to the maximum of $p(\theta,\phi)$ for all $\theta$ and $\phi$:

$$D_1(\theta, \varphi) = \left| \frac{p(\theta, \varphi)}{p_{\max}(\theta, \varphi)} \right| \quad (1)$$

$$= \left\{ \frac{\left| \sum_{j=-(n-1)/2}^{(n-1)/2} A_j \exp\left[ i \frac{2\pi}{\lambda} (jd)\cos\theta\cos\varphi \right] \right|}{p_{\max}(\theta, \varphi)} \right.$$

$$\left. \frac{\left| \sin\left( \frac{n\pi d}{\lambda} \cos\theta\cos\varphi \right) \right|}{\left| n \sin\left( \frac{\pi d}{\lambda} \cos\theta\cos\varphi \right) \right|} \right\}$$

$$A_L = A_M, L, M = -(n-1)/2, -(n-1)/2+1, \ldots (n-1)/2$$

Figures 2A, 2B, 2C, 2D, 2E, 2F:
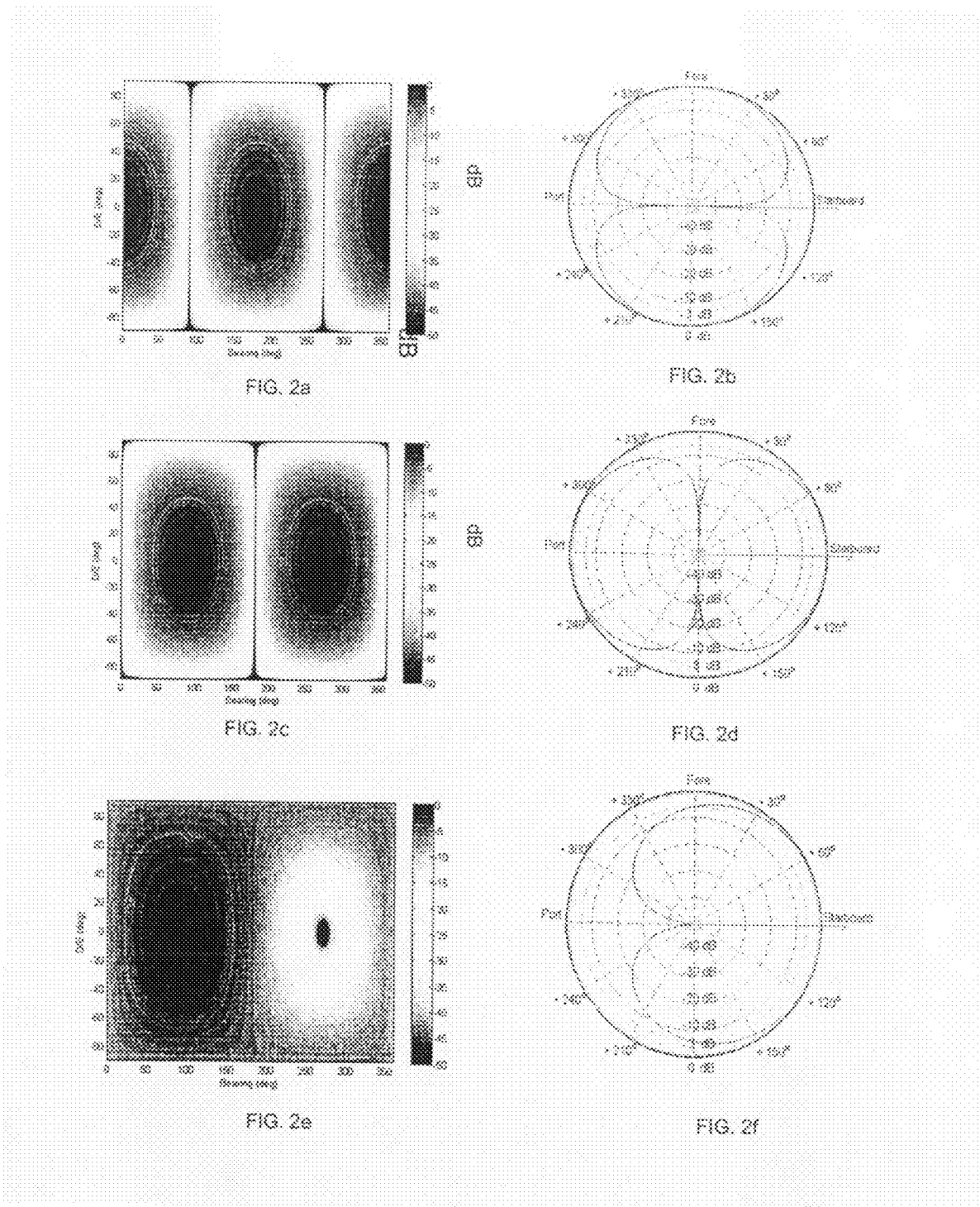
FIG. 2a shows an x-direction oriented vector sensor beam pattern, $D_2(\theta,\phi)$, in a two-dimensional $\theta$ and $\phi$ contour plot, where $w_x=1$, and $w_0=w_y=w_z=0$.
FIG. 2b shows a single slice at $\phi$ equals zero degree beam pattern from $D_2(\theta,\phi)$ in polar plot for the x-direction vector sensor.
FIG. 2c shows a y-direction oriented vector sensor beam pattern, $D_2(\theta,\phi)$, in a two-dimensional $\theta$ and $\phi$ contour plot, where $w_y=1$, and $w_0=w_x=w_z=0$.
FIG. 2d shows a single slice at $\phi$ equals zero degree beam pattern from $D_2(\theta,\phi)$ in polar plot for the y-direction vector sensor.
FIG. 2e shows a combined hydrophone and y-direction oriented vector sensor beam pattern, $D_2(\theta,\phi)$, in a two-dimensional $\theta$ and $\phi$ contour plot, where $w_0=w_y=\frac{1}{2}$, and $w_x=w_z=0$.
FIG. 2f shows a single slice at $\phi$ equals zero degree beam pattern from $D_2(\theta,\phi)$ in polar plot for the combined hydrophone and y-direction vector sensor, where $w_0=w_y=\frac{1}{2}$, and $w_x=w_z=0$.

Within the hybrid towed array, the tri-axial vector sensor shows a beam pattern, $D_2(\theta,\phi)$, based on the following equation:

$$D_2(\theta,\phi) = |w_0 p + w_x \cos\theta\cos\phi + w_y \sin\theta\cos\phi + w_z \sin\phi| \quad (2)$$

where $w_0$, $w_x$, $w_y$, and $w_z$ are weighting coefficients for the hydrophone and tri-axial vector sensor respectively. The tri-axial vector sensor will provide beam patterns on all three axis: x-direction, y-direction and z-direction. FIG. 2a shows an x-direction oriented vector sensor beam pattern, $D_2(\theta,\phi)$, in a two-dimensional $\theta$ and $\phi$ contour plot, where $w_x=1$, and $w_0=w_y=w_z=0$. FIG. 2b shows a single slice at $\phi$ equals zero degree beam pattern from $D_2(\theta,\phi)$ in a polar plot for the x-direction vector sensor. FIG. 2c shows a y-direction oriented vector sensor beam pattern, $D_2(\theta,\phi)$, in a two-dimensional $\theta$ and $\phi$ contour plot, where $w_y=1$, and $w_0=w_x=w_z=0$. FIG. 2d shows a single slice at $\phi$ equals zero degree beam pattern from $D_2(\theta,\phi)$ in a polar plot for the y-direction vector sensor. FIG. 2e shows a combined hydrophone and y-direction oriented vector sensor beam pattern, $D_2(\theta,\phi)$, in a two-dimensional $\theta$ and $\phi$ contour plot, where $w_0=w_y=\frac{1}{2}$, and $w_x=w_z=0$. FIG. 2f shows a single slice at $\phi$ equals zero degree beam pattern from $D_2(\theta,\phi)$ in a polar plot for the combined hydrophone and y-direction vector sensor, where $w_0=w_y=\frac{1}{2}$, and $w_x=w_z=0$.

A multiplication operation in signal processing for the n-elements of pressure sensors 14 and the combined vector sensor 12 provides the new hybrid towed array 10 beam pattern based on the following equation:

$$D_1(\theta, \varphi) \cdot D_2(\theta, \varphi) = \left| \frac{\sum_{j=-(n-1)/2}^{(n-1)/2} A_j \exp\left[ i \frac{2\pi}{\lambda} (jd)\cos\theta\cos\varphi \right]}{p_{\max}(\theta, \varphi)} \right| \cdot \quad (3)$$

$$|w_0 p + w_x \cos\theta\cos\varphi + w_y \sin\theta\cos\varphi + w_z \sin\varphi|$$

Figure 3B:
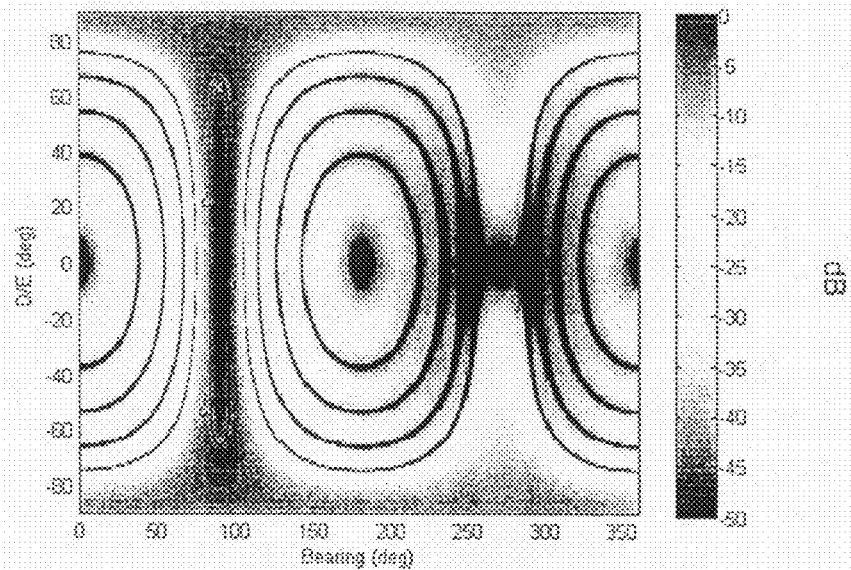
FIG. 3b is an example of a hybrid towed array beam pattern, $D_1(\theta,\phi)\cdot D_2(\theta,\phi)$, in a two-dimensional $\theta$ and $\phi$ contour plot, where n=10, Taylor shading of −25 dB, $w_0=w_y=\frac{1}{2}$, and $w_x=w_z=0$.
Figure 3C:
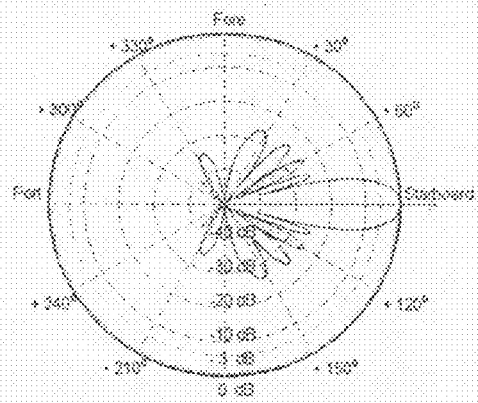
FIG. 3c shows a single slice at $\phi$ equals zero degree beam pattern from $D_1(\theta,\phi)\cdot D_2(\theta,\phi)$ in polar plot for the hybrid towed array for left-right ambiguity clarification.

From equation (3) a sonar system has enough information to resolve the left-right ambiguity for the hybrid towed array 10. Since both $D_1(\theta,\phi)$ and $D_2(\theta,\phi)$ in equation (3) can be steered in the same direction, the hybrid towed array acoustic beam will be steered in space as well. FIG. 3b is an example of a hybrid towed array beam pattern, $D_1(\theta,\phi) \cdot D_2(\theta,\phi)$, in a two-dimensional $\theta$ and $\phi$ contour plot, where n=10, Taylor shading of −25 dB, $w_0=w_y=\frac{1}{2}$, and $w_x=w_z=0$. FIG. 3c shows a single slice at $\phi$ equals zero degree beam pattern from $D_1(\theta, \phi) \cdot D_2(\theta,\phi)$ in a polar plot for the hybrid towed array for left-right ambiguity clarification.

The advantage of the present invention is that it resolves the left-right ambiguity for conventional towed arrays of hydrophone sensors without a complete redesign and fabrication of the towed array. Instead of implementing an entirely new towed array of n-element tri-axial orientation sensitive vector sensors and processing the signals in three dimensions, the design of the present invention only implements a single vector sensor with know orientation into the existing towed array of pressure sensors because the sensor signal from a single vector sensor is sufficient to resolve the left-right ambiguity. This greatly reduces the fabrication difficulties, system complexity, data processing and cost involved in resolving the left-right ambiguity in prior art towed arrays of pressure sensors.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A towed or a line array of acoustic sensors for use with an underwater vehicle comprising:
   a linear array of n acoustic pressure sensor elements;
   an acoustic vector sensor element located at the acoustic center of the linear array of n acoustic pressure sensor elements;
   wherein the linear array of n acoustic pressure sensor elements generates a beam pattern based on the equation:

$$D_1(\theta, \varphi) = \left\{ \frac{\left| \sum_{j=-(n-1)/2}^{(n-1)/2} A_j \exp\left[ i \frac{2\pi}{\lambda} (jd)\cos\theta\cos\varphi \right] \right|}{p_{\max}(\theta, \varphi)} \right.$$

$$\left. \frac{\left| \sin\left( \frac{n\pi d}{\lambda} \cos\theta\cos\varphi \right) \right|}{\left| n \sin\left( \frac{\pi d}{\lambda} \cos\theta\cos\varphi \right) \right|} \right\}$$

$$A_L = A_M, L, M = -(n-1)/2, -(n-1)/2+1, \ldots (n-1)/2$$

where $\theta$ is the angle of bearing, $\phi$ is the angle of depression and elevation, n is the number of acoustic pressure sensors, d is the distance between the sensors and $\lambda$ is the wavelength of the sound wave;
   wherein the acoustic vector sensor element generates a beam pattern based on the equation:

$$D_2(\theta,\phi) = |w_0 p + w_x \cos\theta\cos\phi + w_y \sin\theta\cos\phi + w_z \sin\phi|$$

where $w_0$, $w_x$, $w_y$, and $w_z$ are weighting coefficients to the hydrophone x-, y-, and z-axial vector sensor signal output; and
   wherein a multiplication operation in signal processing for the n acoustic pressure sensors and the acoustic vector sensor generates a beam pattern based on the following hybrid equation:

$$D_1(\theta,\varphi) \cdot D_2(\theta,\varphi) = \left| \frac{\sum_{j=-(n-1)/2}^{(n-1)/2} A_j \exp\left[i\frac{2\pi}{\lambda}(jd)\cos\theta\cos\varphi\right]}{p_{\max}(\theta,\varphi)} \right|.$$

$|w_0 p + w_x \cos\theta\cos\varphi + w_y \sin\theta\cos\varphi + w_z \sin\varphi|$; and wherein based on said hybrid equation a sonar system can resolve the left-right ambiguity for said linear array of n acoustic pressure sensor elements; and the hybrid towed array directivity $D(\theta,\phi)=D_1(\theta,\phi)\cdot D_2(\theta,\phi)$ is rotate able in all directions.

\* \* \* \* \*